United States Patent [19]

Fischer et al.

[11] Patent Number: 5,770,680
[45] Date of Patent: Jun. 23, 1998

[54] AQUEOUS DISPERSIONS OF POLYAMIDES

[76] Inventors: Stephen A. Fischer, 307 Anderson Rd., Yardley, Pa. 19067; David I. Devore, 112 Alberts Way, Langhorne, Pa. 19047; Kartar S. Arora, 106 Harrison Forge Ct., Chalfont, Pa. 18914; Reimar Heucher, 1101 Ashford La., Westmont, Ill. 60559

[21] Appl. No.: 738,402

[22] Filed: Oct. 25, 1996

[51] Int. Cl.⁶ .......................... C08G 69/08; C08G 73/10; C08L 47/08

[52] U.S. Cl. .......................... 528/310; 528/322; 528/332; 528/335; 528/336; 528/339.3; 528/340; 528/347; 524/600; 524/607; 524/608

[58] Field of Search .......................... 524/600, 607, 524/608; 528/339.3, 310, 340, 347, 322, 332, 335, 336

[56] References Cited

U.S. PATENT DOCUMENTS

| | | | |
|---|---|---|---|
| 4,853,421 | 8/1989 | Hayes | 524/607 |
| 4,870,119 | 9/1989 | Yee et al. | 524/607 |
| 4,886,844 | 12/1989 | Hayes | 524/607 |
| 5,025,043 | 6/1991 | Smith | 524/607 |
| 5,109,054 | 4/1992 | Smith | 524/607 |
| 5,162,490 | 11/1992 | Drawert et al. | 524/607 |

*Primary Examiner*—P. Hampton-Hightower
*Attorney, Agent, or Firm*—Ernest G. Szoke; Martin G. Meder; Henry E. Millson

[57] ABSTRACT

A process is provided for preparing a dispersion of a polyamide in water, said process comprising:

dissolving a polyamide having an amine value of greater than about 2 in an organic solvent to form a solution of said polyamide in said solvent, said polyamide and said solvent being at a temperature below the softening point of, said polyamide during said dissolving, said solution further comprising a surfactant and an inorganic alkaline material, adding sufficient water containing an acid to said solution with mixing to form an oil-in-water dispersion, the temperature of said solution and said water being below the softening point of said polyamide during said adding, the amount of said acid being sufficient to neutralize a portion of said inorganic alkaline material, but insufficient to coagulate said polyamide from the resulting oil-in-water dispersion, and removing at least a major amount of said organic solvent from said oil-in-water dispersion. The resulting dispersion is useful in preparing a coating of the polyamide, which coating is useful as an adhesive.

67 Claims, No Drawings

AQUEOUS DISPERSIONS OF POLYAMIDES

FIELD OF THE INVENTION

The present invention relates to aqueous dispersions of polyamides and to methods of preparing and using such aqueous dispersions.

BACKGROUND OF THE INVENTION

Polyamide resins are well known as a class of resins, as are numerous methods for their preparation. Polyamide resins are typically manufactured by reacting a di- or polyfunctional amine with a di- or polyfunctional acid. Most of the commonly-employed diacids and diamines yield polyamide resins which are essentially linear.

The properties of polyamide resins will vary considerably, depending upon the particular synthetic reactants employed. Polyamide resins which are prepared from relatively short chain diacids and diamines having, for example, 5–10 carbon atoms will tend to be relatively crystalline and have excellent fiber forming properties. These types of polyamide resins are typically referred to as nylons.

Polyamide resins are also prepared from relatively long chain polyfunctional acids and diamines. A particularly important class of polyamide resins of this type are referred to as polymerized fatty acid polyamide resins. The polymerized fatty acid polyamide resins are especially useful in products such as hot melt adhesives, water resistant coatings, and binders for printing inks, because of their physical properties, including high strength, excellent flexibility, water and solvent resistance, and the ability to form smooth, non-tacky coatings and films.

The polyfunctional acids used in the preparation of polymerized fatty acid polyamide resins are derived from higher molecular weight unsaturated fatty acids by polymerization. In the polymerization process, the fatty acids having double bond functionalities combine to produce mixtures of higher molecular weight polymeric acids. Saturated fatty acids can also, under certain reaction conditions, polymerize to form polycarboxylic acids.

The polymerized fatty acid polyamide resins are, in turn, typically prepared by reacting one or more suitable diamines—most commonly relatively short chain diamines—with the polymerized fatty acid. Often, another diacid is also reacted to increase the softening point, tensile strength, or other properties. The polymerized fatty acid polyamide resins which are obtained tend to be more amorphous than the nylon types of polyamides resins and are generally more flexible. The differences in the physical properties of the polymerized fatty acid polyamide resins as compared to the nylon types of polyamide resins are related to the long chain length and structural variations of the polymerized fatty acid component.

One of the issues associated with the use of polyamide resins, particularly the polymeric fatty acid polyamides, relates to the methods used to apply the resins to substrates. One method which has been used involves heating the polyamide resins above their melting point and then applying the molten resins to the substrate. This technique, however, has certain inherent problems. For example, polyamide resins typically have high melting points, often higher than the distortion temperatures of the substrates onto which they are to be applied. Accordingly, the hot melt method can only be used in certain limited applications which require relatively expensive application equipment.

It has been recognized that it would be advantageous if the polyamides could be applied at ambient temperatures as solutions or dispersions. For many applications, however, solutions of polyamide resins are unsatisfactory. Polyamide resins as a class have excellent resistance to solvents; even with respect to those solvents in which the polyamide resins are soluble, the solubility typically is relatively low. Furthermore, the solvents which have been used to make polyamide resin solutions often adversely react with the substrates to which the polyamide resin solutions are applied. Further problems associated with solvent solutions are that most solvents used are relatively expensive, often difficult or impossible to remove from the applied coatings, and present fire, toxicity, and environmental pollution problems.

To overcome or at least reduce the problems associated with such solvent-based systems, it has been suggested to prepare emulsions or dispersions of the polyamide resins in water. Early emulsions were prepared by initially dissolving the polyamide resin in an organic solvent and then using selected emulsification agents to form an emulsion of the solvent solution and water. However, the resulting solvent/water/polyamide resin emulsions still had the problems associated with the presence of solvents and were relatively unstable. Those skilled in the art will appreciate that instability is manifested in aqueous resin emulsions or dispersions by phenomena such as phase separation, creaming, coalescence, flocculation, or gelation. Films formed from solvent-containing emulsions also tended to have an undesirable tackiness.

In British patent 1,491,136 there was disclosed a method for forming aqueous dispersions of various plastic powders, including polyamide resin powders. In the disclosed method, the polyamide resin was first mechanically reduced to a powder form and then blended with water and a thickening agent. The method was less than satisfactory. The mechanical reduction of the resins to the required particle size was both expensive and difficult to control, especially for flexible polymers, and often caused thermal degradation of the polymers. Furthermore, the resulting thickened dispersions had limited utility in many applications because of the relatively high viscosity due to the thickening agent.

U.S. Pat. No. 2,430,860 (Cairns) and U.S. Pat. No. 2,714,075 (Watson, et al.) disclose rendering a polyamide resin more readily dispersible in water by chemically modifying the resin so as to include solubilizing groups, for example, incorporating alkoxymethyl groups.

In U.S. Pat. No. 2,811,459 (Wittcoff, et al.) there is disclosed a method for preparing polymerized fatty acid polyamide dispersions wherein the polyamide is formed from a substantial excess of a diamine. The resulting polyamide resins are then dispersed in an aqueous solution of an acid so that the acid forms ammonium salt groups which act as internal surfactants which allow formation of an aqueous dispersion.

In U.S. Pat. No. 2,768,090 (Wittcoff, et al.) a similar process is disclosed wherein the excess amine groups of a polyamide resin are reacted with an acid to form intrinsic ammonium salt groups and, hence, a cationic dispersion which is converted to an anionic dispersion by charge inversion. A similar salt forming process utilizing free amino groups was disclosed in U.S. Pat. No. 2,824,848 (Wittcoff).

In U.S. Pat. No. 2,926,117 (Wittcoff) there is disclosed a method wherein the polyamide resin formed with a deliberate excess of acid groups is then dispersed in an aqueous medium containing an alkaline substance to cause formation of carboxylate salt groups which act as internal surfactants.

U.S. Pat. No. 4,886,844 (Hayes) and U.S. Pat. No. 4,853,421 (Hayes) disclose the preparation of stable aqueous dispersions of nonsolvated, un-neutralized, polymerized fatty acid polyamide resins having low acid and amine number. As disclosed therein, molten resin, water, and a surfactant are subjected to sufficient comminuting forces to form an emulsion in which resin droplets have a volume average size distribution of about 20 microns or less.

U.S. Pat. Nos. 5,025,043 (Smith) and 5,109,054 (Smith) disclose a method for the preparation of stable aqueous dispersions of non-solvated, un-neutralized, low amine, low acid number polymerized fatty acid polyamide resins wherein a polymerized fatty acid polyamide resin which has been prepared so as to have a low acid and low amine number is liquified by heating the polyamide resin to a temperature where it is at or above its melting point. The liquified polymerized fatty acid polyamide resin is then blended with a predetermined amount of water which is heated to a temperature such that the resulting blend will have a temperature above the melting point of the polyamide resin. A surfactant which will promote the emulsification of the polyamide resin and water is included in the mixture. The resulting mixture is then subjected to sufficient comminuting forces to form an emulsion in which droplets of the polyamide resin have a volume average size distribution of about 20 microns or less in diameter and preferably 5 microns or less. The resulting emulsion is then cooled to a temperature below the melting point of the polyamide resin causing the emulsified droplets of the polyamide resin to solidify as finely divided particles which are dispersed uniformly through the aqueous phase.

U.S. Pat. Nos. 5,095,058 (Smith et al.) and 5,236,996 (Smith) disclose aqueous dispersions of polyamide resins having improved stability with respect to gelation and phase separation are provided, along with preparative methods therefor. The improved stability of the provided aqueous dispersions is achieved by the addition to such dispersion of a chemical moiety, such as a water soluble, amphoteric amino acid, anionic and cationic salts of amino acid, or mixtures thereof, in aqueous solutions.

U.S. Pat. No. 5,407,985 (Smith) disclose stable aqueous microdispersions of finely divided polyamide resin particles and methods for the manufacture thereof are provided. The properties of these microdispersions are achieved by processes similar to those described in U.S. Pat. Nos. 5,095,058 and 5,236,996 but with the further addition thereto of an effective amount of a co-surfactant such as a lower alkyl alcohol.

SUMMARY OF THE INVENTION

This invention relates to a process of preparing a dispersion of a polyamide in water, said process comprising:
  dissolving a polyamide having an amine value of greater than about 2 in an organic solvent to form a solution of said polyamide in said solvent, said polyamide and said solvent being at a temperature below the softening point of said polyamide during said dissolving, said solution further comprising a surfactant and an inorganic alkaline material,
  adding sufficient water containing an acid to said solution with mixing to form an oil-in-water dispersion, the temperature of said solution and said water being below the softening point of said polyamide during said adding, the amount of said acid being sufficient to neutralize a portion of said inorganic alkaline material, but insufficient to coagulate said polyamide from the resulting oil-in-water dispersion, and
  removing at least a major amount of said organic solvent from said oil-in- water dispersion.

The polyamide preferably comprises the product of condensing a dibasic acid mixture with a diamine mixture, the equivalents of said diamine mixture being greater than the equivalents of said dibasic acid mixture (e.g. a ratio of from 1.02:1 to 1.1:1), said dibasic acid mixture comprising (i) a $C_{20}$–$C_{44}$ dibasic acid mixture comprised of about 60–100% dimers, 0–40% trimers and 0–5% monomers (preferably about 0.5–0.8 equivalents of said $C_{20}$ to $C_{44}$ dibasic acid), and (ii) at least one $C_6$–$C_{12}$ dibasic acid (preferably about 0.2–0.7 equivalents), said diamine mixture comprising piperazine or a substituted piperazine (preferably about 0.5–0.8 equivalents) and the balance comprising at least one $C_2$–$C_{12}$ alkyl diamine.

DETAILED DESCRIPTION OF THE INVENTION

It will be appreciated that there exist numerous types of polyamide resins which can be employed to form aqueous dispersions according to the present invention. The terms "polyamide resin" or "resin" as employed herein are intended to include compositions comprising individual, chemically distinct polymerized fatty acid polyamide resins as well as blends thereof. Polyamide resins can be obtained commercially or can be prepared by generally well known methods.

The term "polymerized fatty acid" is intended to be generic in nature and to refer to polymerized acids obtained from fatty acids. The term "fatty acids" refers to saturated, ethylenically unsaturated and acetylenically unsaturated, naturally occurring and synthetic monobasic aliphatic carboxylic acids which contain from about 8 to about 24 carbon atoms. While specific references are made in this application to polymerized fatty acid polyamide resins which are obtained from C18 fatty acids, it will be appreciated that the methods of this invention can likewise be employed with other polymerized fatty acid polyamides.

The preferred starting acids for the preparation of the polymerized fatty acids used in this invention are oleic and linoleic acids, due to their ready availability and relative ease of polymerization. Mixtures of oleic and linoleic acids are found in tall oil fatty acids, which are a convenient commercial source of these acids. Fatty acids can be polymerized using various well known catalytic and noncatalytic polymerization methods. A typical composition of the polymerized C18 tall oil fatty acids which are used as the starting materials for the polyamide resins used in the present invention is:

| | |
|---|---|
| C18 monobasic acids (monomer) | 0–15% by wt. |
| C36 dibasic acids (dimer) | 60–95% by wt. |
| C54 (or higher) trimer acid or polybasic acids | 0.2–35% by wt. |

In preparing polymerized fatty acid polyamide resins for use in the present invention, it is preferable that the starting polymerized fatty acid contain as high a percentage as possible of the dimer (C36 dibasic) acid, e.g. at least about 90% by wt., in order to obtain optimum physical properties in the final product.

In addition to the polymerized fatty acids, a wide variety of dicarboxylic acids can be used to prepare polymerized fatty acid polyamide resins, including aliphatic, cycloaliphatic, and aromatic dicarboxylic acids. Representative of such acids-which may contain from 2 to 22 carbon atoms-are oxalic, glutaric, malonic, adipic, succinic, suberic, sebacic, azelaic, pimelic, terephthalic, isophthalic, dodecanedioic and phthalic acids, naphthalene dicarboxylic acids, and 1,4-or 1,3-cyclohexane dicarboxylic acids. Preferred dicarboxylic acids employed in the invention are straight chain aliphatic diacids having at least 6 carbon atoms and more preferably 6 to about 22 carbon atoms such as azelaic, sebacic, and dodecanedioic dicarboxylic acids. It should be understood that use of the corresponding acid anhydrides, esters, and acid chlorides of these acids is included in the term "dicarboxylic acid". These acids and anhydrides are readily available from commercial sources and methods for their preparation are well known.

Monocarboxylic acids may be added to control molecular weight. Preferred monocarboxylic acids are linear and have 2 to 22 carbon atoms. Most preferred are stearic, tall oil fatty and oleic acids.

The diamines used in the preparation of the polymerized fatty acid polyamide resins employed in the present invention may be one or more of the known aliphatic, cycloaliphatic or aromatic diamines having from about 2 to about 20 carbon atoms. Preferred are the alkylene diamines, such as ethylene diamine, 1,3-diaminopropane, 1,4-diaminobutane, terephthalyl diamine, known as p-xylene diamine, 1,6-hexamethylene diamine, bis-(4-cyclohexylamine)methane, 2,2-bis-(4-cyclohexylamine) propane, polyglycol diamines, isophorone diamine, isophthalyl diamine, known as m-xylene diamine, cyclohexanebis (methylamines), 1,4'-bis-(2-aminoethyl)benzene, dimer diamine, polyether diamines, methyl pentamethylene diamine, and piperazine. These diamine compounds are all prepared by well known methods and many are commercially available. Particularly preferred are the straight chain aliphatic diamines of 2 to about 20 carbons atoms, especially ethylene diamine and hexamethylene diamine, and cycloaliphatic diamines, especially 4,4'-methylenebis (cyclohexylamine) and piperazine.

In certain embodiments, the polyamide is prepared from reactants which are further comprised of a polyoxyalkylenediamine. The polyoxyalkylene-diaminereactant comprises one or more amino-compounds where the amino-compound comprises both amine groups and an essentially water-soluble polyether chain. The polyoxyalkyleneamine reactant is soluble or at least partially soluble in water.

Examples of useful polyoxyalkylenediamines have the structural formula:

wherein:
$R^1$ represents a polyoxyalkylene chain having the structural formula:

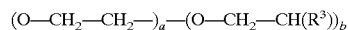

wherein:
$R^3$ is a monovalent organic radical selected from the group consisting of C1 to C4 aliphatic hydrocarbons,
'a' designates a number of ethoxy groups (O—CH$_2$—CH$_2$),
'b' designates a number of monosubstituted ethoxy groups (O—CH$_2$—CH($R^3$)), the sum of 'a' and 'b' is equal to or greater than 10 but less than or equal to 300, provided that for any values of a and b the sequence of ethoxy and monosubstituted ethoxy groups within a polyoxyalkylene chain may be completely random and/or there may be blocks of ethoxy and/or monosubstituted ethoxy groups, and
$R^2$ designates hydrogen or a monovalent organic radical selected from the group consisting of C1 to C4 aliphatic hydrocarbons.

The techniques to prepare suitable polyoxyalkyleneamines are known in the art, and include reacting an initiator containing two hydroxyl groups with ethylene oxide and/or monosubstituted ethylene oxide followed by conversion of the resulting terminal hydroxyl groups to amines. Illustrative of the polyoxyalkyleneamine reactants employed in the invention are the Jeffamine™ brand of polyoxyalkyleneamines available from Huntsman Corporation, Houston, Tex. These polyoxyalkyleneamines are prepared from reactions of bifunctional initiators with ethylene oxide and propylene oxide followed by conversion of terminal hydroxyl groups to amines. The most preferred polyoxyalkyleneamines are the Jeffamine™ D-series polyoxyalkyleneamines from Huntsman Chemical Company which have approximate number average molecular weight between 600 and 6,000.

In the method of the present invention, it is desirable to use as the polymerized fatty acid polyamide a material which is the result of as complete an amidation reaction as possible between the starting polymerized fatty acid and the diamine. Those skilled in the art will recognize that the degree of completion of the amidation process can be determined by evaluating the acid number and the amine number of the final polymer. Ideally, the acid number of the polyamide resin employed should be zero (0). However, it is often difficult, if not impossible, to reach complete reaction, and this value should be no greater than about two, preferably no greater than about 1.0. The polyamide resin should have a relatively low amine number, typically less than about 40, more typically from about 2 to about 20, and even more typically from about 4 to about 15. The preferred polyamides have amine numbers of from about 6 to about 12, more typically from about 7 to about 10.

The number of free acid groups and free amine groups present in the polymerized fatty acid polyamide resin are directly related to the relative amount of the polymeric fatty acids, dicarboxylic acids and diamines involved in the polymerization reaction and the degree of completion of the reaction. For the above reasons, approximately stoichiometric amounts (typically with a slight excess of amine groups, e.g. a ratio of total amine to total acid groups of from about 1.02:1 to about 1.1:1, more typically from about 1.04:1 to about 1.08:1) of the polymerized fatty acids plus the dicarboxylic acids and the diamines based on the total number of available acid and amine groups should be used to prepare the polyamide resins for this invention and the reaction conditions should be selected to ensure completion or substantial completion of the amidation reaction. The reaction conditions required for the amidation reaction are generally well known in the art, with the reaction being generally conducted at temperatures from about 100° C. to about 300° C. for from about 1 to about 8 hours. The use of acid catalysts, such as phosphoric acid, and vacuum can be used, especially in the latter part of the reaction, to yield a more complete amidation reaction.

Examples of useful polyamide resins include those disclosed in, for example, U.S. Pat. Nos. 3,377,303, 4,777,238, and 5,154,760, the disclosures of which are incorporated herein by reference thereto.

Generally, the polyamide resins most useful herein will have a moderate molecular weight, i.e. a molecular weight less than that of high polyamide polymers such as the nylons, but greater than polyamide oligomers, e.g. the aminopolyamides that are used as epoxy curing agents. Preferred polyamides typically have a weight average molecular weight of greater than about 35,000, more typically greater than about 40,000, but less than about 200,000, more typically less than about 150,000, and more typically from about 50,000 to 100,000. Preferred polyamides will also have a polydispersity (defined as weight average molecular weight divided by number average molecular weight) of less than about 4, more typically less than about 3.5, even more typically less than about 3.0, and typically between about 1.5 and about 3.0. more typically between about 2.0 to about 2.8. The molecular weights of the polyamide can be determined by size exclusion chromatography as set forth in more detail below.

The first step of the process of this invention is the formation of a solution of a polyamide resin in an organic solvent. The organic solvent will typically have a Hildebrand solubility parameter of from about 9 to about 12, more typically from about 10 to about 11.5, and most typically from about 10.5 to about 11.0. The organic solvent should be miscible with water or at least slightly soluble therein. Examples of useful solvents include oxygenated hydrocarbons such as ketones (e.g. acetone, methyl ethyl ketone, and cyclohexanone), esters (e.g. methyl acetate and ethyl acetate), ethers (e.g. ethylene glycol monoethyl ether, 1,4-dioxane and tetrahydrofuran), and heterocyclics, e.g. N-methyl 2-pyrrolidone. Preferred examples of organic solvents are the medium chain (e.g. $C_3$–$C_5$ alkanols) including n-propanol, isopropanol, n-butanol, and isobutanol. Preferred solvents form a low boiling azeotrope with water to facilitate removal of the solvent from dispersion by distillation thereof. Preferred solvents also have a boiling point at atmospheric pressure of at least about 100° C. to allow heating, without pressurizing, of the solution of polyamide to a temperature below the softening point (e.g. by the ball and ring procedure of ASTM E28-67) of the polyamide. This heating reduces the viscosity of the solution of polyamide which facilitates mixing of the solution with the other ingredients of the dispersion.

The organic solvent is typically employed in an amount that is just sufficient to dissolve all of the polyamide to be dispersed and to provide a fluid viscosity at a temperature at about the atmospheric boiling point of water, e.g. at about 90° C. to about 100° C. Typically, the weight ratio of polyamide resin solids to solvent will be from about 1:2 to 5:1, more typically from about 1:1 to about 3:1, and most typically from about 1.5:1 to about 2.5:1.

A surfactant is also used in the preparation of the dispersion and it is typically dissolved in the solution of polyamide and organic solvent, but it can be present in a pre-mix with the polyamide and/or solvent. The surfactant is typically used in an amount of from about 0.15 to about 20%, more typically from about 1% to about 15% and even more typically from about 5% to about 10% by weight of the polyamide resin solids.

The surfactant is typically a nonionic surfactant, but an anionic surfactant can be used along with the nonionic surfactant. When an anionic surfactant is used with a nonionic surfactant, the weight ratio of nonionic surfactant to anionic surfactant typically ranges from about 20:1 to about 1:1, more typically from about 9:1 to about 1:1, and even more typically from about 4:1 to about 2:1.

Nonionic surfactants are compounds which contain a hydrophobic group and a nonionic hydrophilic group, typically a polyoxyethylene group. Examples of non-ionic surfactants include alkylphenoxypolyethoxyethanols having alkyl groups of from about 7 to 18 carbon atoms and from about 6 to about 60 oxyethylene units, such as heptylphenoxypolyethoxyethanols, methyloctylphenoxypolyethoxyethanols, and the like; polyethoxyethanol derivatives of methylene-linked alkyl phenols; sulfur-containing agents such as those made by condensing from about 6 to about 60 (more typically from about 20 to about 50) moles of ethylene oxide with nonyl mercaptan, dodecyl mercaptan, and the like, or with alkylthiophenols wherein the alkyl groups contain from 6 to 16 carbon atoms; ethylene oxide derivatives of long-chained carboxylic acids, such as lauric acid, myristic acid, palmitic acid, oleic acid, and the like, or mixtures of acids such as those found in tall oil containing from 6 to 60 oxethylene units per molecule; analogous ethylene oxide condensates of long-chained alcohols such as octyl, decyl, lauryl, or cetyl alcohols, analogous ethylene oxide condensates of long-chained secondary alcohols such as mixtures of C11 to C15 secondary alcohols; ethylene oxide derivative of etherified or esterified polyhydroxy compounds having a hydrophobic hydrocarbon chain, such as sorbitan monostearate containing from 6 to 60 oxethylene units; also, ethylene oxide condensates of long-chain or branched chain amines, such as dodecyl amine, hexadecyl amine, and octadecyl amine, containing from 6 to 60 oxyethylene units; block copolymers of ethylene oxide sections combined with one or more hydrophobic propylene oxide sections. Preferred surfactants are the ethoxylated fatty alcohols having from about 20 to about 50 repeating ethyleneoxy units and an alkyl group of from about 10 to about 18 carbon atoms.

Anionic surfactants are compounds which contain a hydrophobic group and an anionic group, typically a carboxylate, sulfonate, sulfate, or phosphate group. Typical examples of anionic surfactants are alkylbenzenesulfonates, alkanesulfonates, olefin sulfonates, alkylether sulfonates, glycerol ether sulfonates, a-methyl ester sulfonates, sulfofatty acids, alkylsulfates, e.g. lauryl sulfate, fatty alcohol ether sulfates, glycerol ether sulfates, hydroxy mixed ether sulfates, monoglyceride (ether) sulfates, fatty acid amide (ether) sulfates, mono- and dialkyl sulfosuccinates, mono- and dialkyl sulfosuccinamates, sulfotriglycerides, amide soaps, ether carboxylic acids and salts thereof, fatty acid isethionates, fatty acid sarcosinates, fatty acid taurides, acyl lactylates, acyl tartrates, acyl glutamates, acyl aspartates, alkyl oligoglucoside sulfates, protein fatty acid condensates (particularly wheat-based vegetable products) alkyl (ether) phosphates, and alkaryl (ether) phosphates.

Preferred anionic surfactants are phosphate esters of ethoxylated alkanols or alkylphenols. A particularly preferred class of anionic surfactants are mixtures of compounds of the formulas (I) R—O—$(CH_2CH_2O)_n$—$PO_3M_2$ and (II) $(R—O—(CH_2CH_2O)_n)_2PO_2M$ where n is a number from 1 to 40, R is an alkyl or aralkyl group and M is hydrogen, ammonia or an alkali metal. Preferably R is a $C_4$ to $C_{12}$ alkylphenyl and n is from about 5 to about 15. A particularly preferred representative of this preferred class of anionic surfactants is commercially available as Rhodafac RE-610 from Rhone-Poulenc, Cranberry N.J., which is believed to be a 4:1 mixture of compounds of formulas I and II, respectively, wherein R is nonylphenyl and n averages about 9.

The solution of polyamide in organic solvent will also contain an inorganic alkaline material in an amount sufficient to cause the solution to form an oil-in-water dispersion. Typically said inorganic alkaline material is present in said solution in an amount sufficient to cause said solution to exhibit a pH of at least about 10, more typically at least about 11, and even more typically at least about 12, prior to the addition of water to the dispersion to form an oil-in-water dispersion. Examples of inorganic alkaline materials include high solids aqueous solutions of sodium hydroxide, potassium hydroxide, sodium carbonate, soda ash, and the like. Typically the aqueous solution of inorganic alkaline material is added to a solution of the polyamide and surfactant in organic solvent with mixing. The alkaline material can, however, be pre-mixed with any of the other materials. The preferred inorganic alkaline material is sodium hydroxide and the amount of sodium hydroxide will typically be greater than about 0.75% of the weight of the polyamide, more typically at least about 0.80%, even more typically about 0.90%, and preferably at least about 1.0% by weight of the polyamide.

Water which contains an acid is then added, with mixing, to the mixture in an amount sufficient to form an oil-in-water dispersion. The aqueous acid is typically at room temperature when added to form the oil-in-water dispersion. The temperature of the resulting mixture is thus typically well below the softening temperature of the polyamide resin, more typically more than about 50° C. below the softening point of the polyamide resin, e.g. the temperature of the resulting mixture is typically from about 60° C. to about 85° C. The aqueous acid is typically added slowly to form the oil-in-water dispersion, typically at a rate of 1 part to 5 parts by weight of aqueous acid per 100 parts by weight of polyamide resin solids per minute. The mixture is typically heated during the addition of the aqueous acid to maintain the resulting mixture at an elevated temperature, i.e. the resulting mixture will typically be at a temperature of from about 60° C. to about 85° C. during the addition of aqueous acid. The elevated temperature will typically be more than about 50° C. below the softening point of the polyamide resin. The total amount of aqueous acid added will be sufficient to provide a mixture having a weight ratio of water to polyamide resin solids typically in the range from about 1:1 to 5:1, more typically from about 1:1 to about 3:1, and most typically from about 1.5:1 to about 2.85:1. Of course, if the distillation of the organic solvent will remove a portion of the water, e.g. as an azeotrope with the organic solvent, then the amount of water added should be adjusted to obtain a dispersion having the desired amount of water after distillation.

The aqueous acid can be characterized as dilute. The concentration of the acid in the water should be sufficiently low so that the pH of the oil-in-water dispersion prior to removal of the organic solvent will be sufficiently high to form an oil-in-water dispersion without coagulation of the polyamide therefrom. The concentration of the acid in the water should be sufficiently low so that the pH of the oil-in-water dispersion prior to removal of the organic solvent will be at least about 9, and more typically at least about 9.5, and preferably at least about 10.0.

The acid can be any acid that is compatible with the dispersion. Examples include mineral acids, such as hydrochloric acid, sulfuric acid and phosphoric acid, and organic acids such as carboxylic acids and sulfonic acids. Preferred acids are the lower alkyl monocarboxylic acids such as acetic acid and propionic acid, and the lower alkylene dicarboxylic acids such as oxalic acid. The preferred acid is acetic acid and the amount of acetic acid used to partially neutralize the inorganic alkaline material will typically be greater than about 0.5% to about 1% of the weight of the polyamide, with a mole ratio of inorganic alkaline material to acid of from about 1.25:1 to about 3:1, more typically from about 1.5:1 to about 2.5:1.

The mixing used to form the dispersion need not be high shear mixing. Thus, there is typically no need to use conventional homogenizers or dispersers to obtain a dispersion of the desired particle size. Typically, the mixing is low to moderate shear mixing such as that provided by a propeller agitator operated at low to moderate rpm, e.g. a simple paddle mixer of 5 to 10 cm diameter operating at 350 to 450 rpm.

The organic solvent is then essentially completely removed from the resulting oil-in-water dispersion by distillation thereof. The distillation will typically be a conventional fractional distillation, at atmospheric or reduced pressure, to retain the majority by weight of the water in the dispersion. The distillation should be effective to remove essentially all of the organic solvent, e.g. less than about 2%, more typically less than about 1%, by weight of residual organic solvent will remain in the dispersion. Removal of amounts less than about 1% by weight is generally not necessary or efficient so that the amount of residual solvent will typically range from about 0.5% to about 0.95%. After distillation, the product oil-in-water dispersion is cooled. The pH of the dispersion can then be neutralized to an essentially neutral pH, e.g. typically a pH of about 4 to about 8.5, more typically from 6.0 to about 8.0, with an acidic material, e.g. a mineral acid such as hydrochloric acid or sulfuric acid, or an organic acid such as acetic acid or propionic acid.

The resulting dispersion will typically have a volume average particle size of from about 0.01 to about 20 micrometers, more typically from about 0.01 to about 5 micrometers, and even more typically from about 0.05 to about 1 micrometer. It has also been found that the process of this invention will have little or no effect on the molecular weight of the polyamide, i.e. there will be essentially no hydrolysis of the polyamide during the process of dispersing the polyamide.

The amount of coagulum that is formed can be measured by passing the dispersion through a 60 mesh (250 micrometer) screen. The polyamide is considered to have coagulated from the dispersion if the amount of material collected is greater than 2% by weight of the dispersion.

The polyamide aqueous dispersions of this invention can contain various additives in addition to the above-noted materials, such as water soluble alkali metal salts of polymeric organic acids and protective colloids such as lignin derivatives, proteins, water soluble cellulose derivatives, starch, alginic acid, and long chain alcohols and lecithin. The amount of such additives employed can vary in amounts from about 0% to about 5% by weight, based on the weight of the polyamide resin.

The aqueous dispersion may also contain a thickener. The amount of thickener can be adjusted to obtain a dispersion having a viscosity as desired. The thickener will typically be one of two types, i.e. a water-soluble gum or an associative thickener. Water-soluble gums are described in *Encyclopedia of Polymer Science and Engineering*, vol. 7, pp. 589–613 (John Wiley & Sons, Inc. N.Y.,N.Y. 1987), the disclosure of which is incorporated by reference. These materials are high molecular weight polymers, typically polysaccharides, which are soluble in water and thicken by polymer chain entanglement. Examples of such polymers include hydroxyethylcellulose and carboxymethylcellulose. Synthetic polymers that also thicken by chain entanglement are also available. Examples include the alkali swellable acrylic polymers, e.g. copolymers of low alkyl (e.g. methyl, ethyl or butyl) acrylate esters with acrylic or methacrylic acid. These polymers typically thicken water at a neutral or alkaline pH, e.g. a pH greater than about 6.

The thickener will preferably be an associative thickener. Associative thickeners are so called because the mechanism by which they thicken may involve hydrophobic associations between the hydrophobic species in the thickener molecules and other hydrophobic surfaces, either on other thickener molecules, or on molecules in the system to be thickened. The different types of associative thickeners include, but are not limited to, hydrophobically-modified polyurethanes, hydrophobically-modified polyethers, hydrophobically-modified alkali soluble emulsions, hydrophobically modified hydroxyethyl cellulose or other products, and hydrophobically modified polyacrylamides. The molecular weight and HLB of these associative thickeners, which usually are water soluble or dispersible polymers, is chosen to be sufficiently high to impart desired rheological properties to an aqueous composition containing the thickener. Typically, the polymer has a structure such that a solution containing up to 2–3 weight percent of this polymer will exhibit a viscosity of at least 5,000, preferably at least 15,000, and most preferably at least 20,000 centipoise (as measured on a Brookfield viscometer with a number 3 spindle at 10 RPM at 25° C.). Examples of associative thickeners are disclosed in U.S. Pat. No. 5,425,806 (Doolan et al.), the disclosure of which is incorporated herein by reference.

Precise levels of the thickener in the dispersion will vary depending upon the nature and efficiency of the thickener and the viscosity desired of the dispersion, but will generally vary between 0.1% and about 10%, based on the total weight of the system to be thickened, more typically from about 0.1% to about 5%. The viscosity of the dispersions without added thickener will typically be in the range of 10 to 100 centipoise. The amount of thickener will typically be sufficient to impart to the dispersion a viscosity greater than 100 centipoise, e.g. from about 150 centipoise to about 5,000 centipoise.

Among the associative thickeners, two chemical types are preferred, i.e. urethane thickeners and polyether thickeners. The urethane thickeners useful in the invention are urethane-functional compounds having at least two hydrophobic segments separated by at least one hydrophilic segment. These segments allow the polymer to act as an associative thickener for an oil-in-water emulsion. Examples of such compounds are found in U.S. Pat. No. 4,079,028, (Emmons et al.), the disclosure of which is incorporated herein by reference. Typically, the polymers have at least three low molecular weight hydrophobic groups at least two of which are terminal (external) hydrophobic groups. Many of the polymers also contain one or more internal hydrophobic groups. The hydrophobic groups typically together contain a total of at least 20 carbon atoms and are typically linked through hydrophilic (water-soluble) groups containing polyether segments of at least about 1,500, preferably at least about 3,000, molecular weight each so that the polymers readily solubilize in water, either by self-solubilization or through interaction with a known solubilizing agent such as a water miscible alcohol or surfactant. The molecular weight of the polyurethanes is typically of the order of about 10,000 to 200,000.

The polyether thickeners are polyether-functional compounds having at least two hydrophobic segments separated by at least one hydrophilic segment. These segments allow the polymer to act as an associative thickener for an oil-in-water emulsion. Examples of such compounds are found in U.S. Ser. No. 07/787,905, filed Nov. 7, 1991, and U.S. Ser. No. 08/236,328, filed May 9, 1994, the entire disclosures of which are incorporated herein by reference. This latter application discloses compounds having the formula (I):

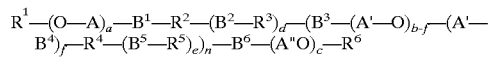

wherein:

$R^1$ and $R^6$ are monovalent hydrophobic groups independently selected from the group consisting of an aliphatic group, a substituted aliphatic group, an aromatic group, and a substituted aromatic group;

$R^2$ and $R^4$ are independently selected from the group consisting of aliphatic, substituted aliphatic, aromatic, or substituted aromatic radicals, each radical being divalent or trivalent;

$R^3$ and $R^5$ are independently selected from hydrogen, lower alkyl and lower aralkyl;

$B^1$, $B^2$, $B^3$, $B^4$, $B^5$, and $B^6$ are linking groups independently selected from the group consisting of an oxygen atom (to form the ether linkage —O—), a carboxylate group (to form an ester linkage $R^2$—C(O)—O— and/or $R^4$—C(O)—O—), an amino group (to form the amine linkage $R^2$—N(R)— and or $R^4$—N(R)—, wherein R is hydrogen, lower alkyl, lower aralkyl, or lower acyl), and an amido group (to form the amide linkage $R^2$—N(R)—C(O)— and/or $R^4$—N(R)—C(O)—, wherein R is hydrogen, lower alkyl, lower aralkyl, or lower acyl);

each of a, b, c, d, e, f, and n are integers, wherein each of a and c are independently any integer from greater than 20 to about 200; b is any integer from greater than 20 to about 450; d, e, and f are zero or 1; and n is any integer from 1 to about 5; and each of A, A', and A" is independently an ethylene, 1,2-propylene, 1,2-butylene unit or combinations thereof.

In preferred compounds, each of $R^1$ and $R^6$ is independently an aliphatic, substituted aliphatic, aromatic, or substituted aromatic radical having from 4 to about 50 carbon atoms; each of $B^1$–$B^6$ is an oxygen atom; $R^2$ and $R^4$ are both either propanetriyl or meta-xylyl; d and e are either (i) both zero (e.g. when $R^2$ and $R^4$ are both meta-xylyl) or (ii) both 1 and $R^3$ and $R^5$ are hydrogen, methyl or benzyl (e.g. when $R^2$ and $R^4$ are both propanetriyl); f is zero; each of A, A', and A" are ethylene, n is 1, b is from about 50 to about 450, more preferably from about 90 to about 450, and the values of a and c independently range from about 50 to about 150.

The polyamide dispersion may likewise contain other materials such as viscosity modifiers, plasticizers, dyes, pigments and the like. The dispersion will typically be free of amino acid stabilizers such as those disclosed in U.S. Pat. No. 5,407,985, discussed above. The aqueous dispersions may be used in, for example, overprint varnishes and aqueous inks, as well as in structural and laminating adhesives.

The following examples will serve to further illustrate the invention, but should not be construed to limit the invention, unless expressly set forth in the appended claims. All parts, percentages, and ratios are by weight unless otherwise indicated in context. As used herein, the term "major amount" shall mean at least 50% by weight and the term "minor amount" shall mean less than 50% by weight.

EXAMPLES

Test Methods

Determination of Molecular Weight and Molecular Weight Distribution (MWD) of Polyamide Dispersions by SEC Sample Preparation Weigh approximately 60 mg of the sample into a disposable scitillation vial. Add 5 mls of the solvent mixture (tetrahydrofuran/methanol 75/25 with 0.5% triethylamine) using a graduated disposable 5 mls pippete. Upon dissolution, filter about 1 ml of solution through a 0.5 micron metal frit into an autosampler vial.

Molecular weight calibration and calculation:

The SEC column was calibrated with a dozen of narrow MWD polystyrene standards ranging from a molecular weight of 1,000 Daltons to a molecular weight of 2,000,000

Daltons. The molecular weight averages of the sample was calculated from the detector response and retention time against this calibration curve via PE Nelson SEC software.
Chromatographic conditions Instrument: Spectra-Physics IsoChrom LC pump+Perkin Elmer Autosampler Column: Jordi DVB Linear Mobile Phase: THF/MeOH 75/25 with 0.5% TEA Flow Rate: 1.0 ml/min.

Injection Volume: 100 microliters

Detector: Erma DRI @ 35 Deg. C.

Example 1

A polyamide resin can be prepared in a resin kettle from a mixture of dibasic acids and diamines as follows. The dibasic acid mixture is 54 eq. % dimer acid, available from Henkel Corp. as VERSADYME 288 and having a minimum dimer content of about 90% by weight, and 46 eq. % of azelaic acid. The diamine mixture is 24.5 eq. % ethylenediamine and 74.5 eq. % piperazine. The ratio of total acid equivalents to total amine equivalents is about 0.95:1, respectively. The mixture, which also contains 0.022 parts by weight of phosphoric acid catalyst per hundred parts by weight of dimer acid and 0.0005 parts by weight of an anti-foam per hundred parts by weight of dimer acid is heated to 225° C. under nitrogen sparge over a period of about 1.5 to 2 hours. After about 1.5 hours at 225° C., a vacuum of about 40 mm of Hg is applied for about one hour. Vacuum is then broken and the mixture is discharged from the resin kettle.

A dispersion of the polyamide resin is prepared as follows.

| Composition | Parts |
| --- | --- |
| Solid polyamide resin | 26.50 |
| Surfactant (Trycol 6969, 70% wt. active, Henkel Corp.) | 2.65 |
| isobutanol (flammable solvent, bp = 108° C.) | 13.26 |
| 50% sodium hydroxide solution | 0.53 |
| aqueous solution of acetic acid (0.33%) | 79.09 |
| defoamer (Foamaster VF, Henkel Corp.) | 0.04 |
| (less azeotrope of 50:50 isobutanol-water mix) | (−26.50) |
| ethylene glycol | 3.00 |
| 10% acetic acid solution | 1.43 |
| | 100.00 |

Procedure

Charge solid polyamide resin, surfactant, and isobutanol to the reactor. (The Trycol 6969 surfactant is a 70% solids 30 mole ethoxylate of nonylphenol and has an HLB of about 17.1). Start gentle agitation, heat to 100° C., and hold for 15 minutes. Cool to 85° C. Charge sodium hydroxide solution and mix for 15 minutes. Charge aqueous solution of acetic acid (0.33% in water) to reactor at 1.32 parts/minutes while allowing the temperature in the reactor to drop to 70° C. to 75° C. Charge defoamer, heat to reflux and remove azeotrope. Cool to 40° C. and charge ethylene glycol. Adjust the pH of the dispersion to 7.0–7.5 with acetic acid. Cool to 25° C. to 30° C. and discharge dispersion.

Example 2

Example 1 can be repeated, but with the use of an acid component that is 60.5 eq. % dimer acid, 0.5 eq. % stearic acid, and 39 eq. % azelaic acid, ;and an amine component that is 55 eq. % of piperazine, 25 eq. % ethylenediamine, and 20 eq. % of an N -alkyl 1,3-propylenediamine, wherein the alkyl group corresponds to tall oil fatty acid in chain length and chain length distribution.

Example 3

A dispersion of the polyamide resin of Example 1 is prepared as follows.

| Composition | Parts |
| --- | --- |
| Solid polyamide resin | 25.50 |
| Surfactant (Trycol 6969, 70% wt. active, Henkel Corp.) | 2.36 |
| isopropanol | 12.75 |
| 50% sodium hydroxide solution | 0.96 |
| aqueous solution of acetic acid (0.33%) | 76.11 |
| defoamer (Foamaster VF, Henkel Corp.) | 0.05 |
| (less azeotrope of 50:50 isobutanol-water mix) | (−25.50) |
| ethylene glycol | 2.89 |
| 10% acetic acid solution | 4.93 |
| | 100.00 |

Procedure

Charge solid polyamide resin, surfactant, and isopropanol to the reactor. (The Trycol 6969 surfactant is a 70% solids 30 mole ethoxylate of nonylphenol and has an HLB of about 17.1). Start gentle agitation, heat to reflux (about 85° C.) and hold for 15 minutes. Cool to 75° C. Charge sodium hydroxide solution and mix for 15 minutes. Charge aqueous solution of acetic acid (0.33% in water) to reactor at 1.32 parts/minutes at 70° C. Charge defoamer, heat to reflux and remove azeotrope. Cool to 40° C. and charge ethylene glycol. Adjust the pH of the dispersion to 7.0–7.5 with acetic acid. Cool to 25° C. to 30° C. and discharge dispersion. Filter through a 60 mesh screen.

Example 4

A dispersion of the polyamide resin of Example 2 is prepared as follows.

| Composition | Parts |
| --- | --- |
| Solid polyamide resin | 25.50 |
| Surfactant (Trycol 6969, 70% wt. active, Henkel Corp.) | 2.36 |
| isopropanol | 12.75 |
| 50% sodium hydroxide solution | 0.96 |
| aqueous solution of acetic acid (0.33%) | 76.11 |
| defoamer (Foamaster VF Henkel Corp.) | 0.05 |
| (less azeotrope of 50:50 isobutanol-water mix) | (−25.50) |
| ethylene glycol | 2.89 |
| 10% acetic acid solution | 4.93 |
| | 100.00 |

Procedure

Charge solid polyamide resin, surfactant, and isopropanol to the reactor. (The Trycol 6969 surfactant is a 70% solids 30 mole ethoxylate of nonylphenol and has an HLB of about 17.1). Start gentle agitation, heat to reflux (about 85° C.) and hold for 15 minutes. Cool to 75° C. Charge sodium hydroxide solution and mix for 15 minutes. Charge aqueous solution of acetic acid (0.33% in water) to reactor at 1.32 parts/minutes at 70° C. Charge defoamer, heat to reflux and remove azeotrope. Cool to 40° C. and charge ethylene glycol. Adjust the pH of the dispersion to 7.0–7.5 with acetic acid. Cool to 25° C. to 30° C. and discharge dispersion. Filter through a 60 mesh screen.

What is claimed is:

1. A process of preparing a dispersion of a polyamide in water, said process comprising:

dissolving a polyamide having an amine value of greater than about 2 in an organic solvent to form a solution of said polyamide in said solvent, said polyamide and said solvent being at a temperature below the softening point of said polyamide during said dissolving, said solution further comprising a surfactant and an inorganic alkaline material, and wherein said polyamide has a weight average molecular weight greater than about 35,000, adding sufficient water containing an acid to said solution with mixing to form an oil-in-water dispersion, the temperature of said solution and said water being below the softening point of said polyamide during said adding, the amount of said acid being sufficient to neutralize a portion of said inorganic alkaline material, but insufficient to coagulate said polyamide from the resulting oil-in-water dispersion, and removing at least a major amount of said organic solvent from said oil-in-water dispersion.

2. A process as claimed in claim 1 wherein said polyamide is comprised of a polymerized fatty acid.

3. A process as claimed in claim 1 wherein said polyamide is comprised of a polymerized fatty acid derived from carboxylic acids which contain from about 8 to about 24 carbon atoms.

4. A process as claimed in claim 1 wherein said polyamide is comprised of a polymerized fatty acid derived from carboxylic acids which contain about 18 carbon atoms.

5. A process as claimed in claim 1 wherein said polyamide has an acid value no greater than about 2.

6. A process as claimed in claim 1 wherein said polyamide has an amine value of less than about 40 and an acid value of no greater than about 1.0.

7. A process as claimed in claim 1 wherein said polyamide has an acid value of no greater than about 2 and an amine value of from about 7 to about 10.

8. A process as claimed in claim 1 wherein said polyamide is the product of the reaction wherein the ratio of total amine to total acid groups is from about 1.02:1 to about 1.1:1.

9. A process as claimed in claim 1 wherein said polyamide is the product of the reaction wherein the ratio of total amine to total acid groups is from about 1.04:1 to about 1.08:1.

10. A process as claimed in claim 1 wherein the amount of said acid is insufficient to lower the pH of said oil-in-water dispersion below about 9.

11. A process as claimed in claim 1 wherein said inorganic alkaline material is present in said solution in an amount sufficient to cause said solution to exhibit a pH of at least about 10, prior to said adding of said water containing an acid.

12. A process as claimed in claim 1 wherein said inorganic alkaline material is present in said solution in an amount sufficient to cause said solution to exhibit a pH of at least about 11, prior to said adding of said water containing an acid and wherein the amount of said acid is insufficient to lower the pH of said oil-in-water dispersion below about 9.5.

13. A process as claimed in claim 1 wherein said inorganic alkaline material is present in said solution in an amount sufficient to cause said solution to exhibit a pH of at least about 12, prior to said adding of said water containing an acid, and wherein the amount of said acid is insufficient to lower the pH of said oil-in-water dispersion below about 10.0.

14. A process of preparing a dispersion of a polyamide in water, said process comprising:

dissolving a polyamide having an amine value of greater than about 2 in an organic solvent having a Hildebrand solubility parameter of from about 9 to about 12 to form a solution of said polyamide in said solvent, said polyamide and said solvent being at a temperature below the softening point of said polyamide during said dissolving, said solution further comprising a surfactant and an inorganic alkaline material, and wherein said polymamide has a weight average molecular weight greater than about 35,000, adding sufficient water containing an acid to said solution with mixing to form an oil-in-water dispersion, the temperature of said solution and said water being below the softening point of said polyamide during said adding, the amount of said acid being sufficient to neutralize a portion of said inorganic alkaline material, but insufficient to coagulate said polyamide from the resulting oil-in-water dispersion, and removing at least a major amount of said organic solvent from said oil-in-water dispersion.

15. A process of preparing a dispersion of a polyamide in water, said process comprising:

dissolving a polyamide having an amine value of greater than about 2 in an organic solvent to form a solution of said polyamide in said solvent, said polyamide and said solvent being at a temperature below the softening point of said polyamide during said dissolving, said solution further comprising a surfactant and an inorganic alkaline material, and wherein said polyamide has a weight average molecular weight greater than about 35,000, adding sufficient water containing an acid to said solution with mixing to form an oil-in-water dispersion, the temperature of said solution and said water being below the softening point of said polyamide during said adding, the amount of said acid being sufficient to neutralize a portion of said inorganic alkaline material, but Insufficient to coagulate said polyamide from the resulting oil-in-water dispersion, and removing essentially all of said organic solvent from the resulting oil-in-water dispersion by distillation thereof.

16. A process as claimed in claim 14 wherein said organic solvent has a Hildebrand solubility parameter of from about 10 to about 11.5.

17. A process as claimed in claim 14 wherein said organic solvent has a Hildebrand solubility parameter of from about 10.5 to about 11.0.

18. A process as claimed in claim 14 wherein said organic solvent is an oxygenated hydrocarbon.

19. A process as claimed in claim 14 wherein said organic solvent is selected from the group consisting of alkanols, ketones, esters, ethers, and heterocyclics.

20. A process as claimed in claim 14 wherein said organic solvent is selected from the group consisting of acetone, methyl ethyl ketone, cyclohexanone, methyl acetate, ethyl acetate, ethylene glycol monoethyl ether, 1,4-dioxane, tetrahydrofuran, and N-methyl 2-pyrrolidone.

21. A process as claimed in claim 14 wherein said organic solvent is a $C_3$–$C_5$ alkanol.

22. A process as claimed in claim 14 wherein said organic solvent is selected from the group consisting of n-propanol, isopropanol, n-butanol, and isobutanol.

23. A process as claimed in claim 14 wherein said organic solvent forms a low boiling azeotrope with water.

24. A process as claimed in claim 14 wherein said organic solvent has a boiling point at atmospheric pressure of at least about 100° C.

25. A process as claimed in claim 14 wherein the amount of said organic solvent is sufficient to dissolve all of the polyamide to be dispersed and to provide a fluid viscosity at a temperature at about 90° C. to about 100° C.

26. A process as claimed in claim 14 wherein the weight ratio of polyamide resin solids to organic solvent is from about 1:2 to 5:1.

27. A process as claimed in claim 14 wherein the weight ratio of polyamide resin solids to organic solvent is from about 1:1 to about 3:1.

28. A process as claimed in claim 14 wherein the weight ratio of polyamide resin solids to organic solvent is from about 1.5:1 to about 2.5:1.

29. A process as claimed in claim 1 wherein the surfactant is present in an amount of from about 0.15 to about 20% by weight of the polyamide resin solids.

30. A process as claimed in claim 1 wherein the surfactant is present in an amount of from about 1% to about 15% by weight of the polyamide resin solids.

31. A process as claimed in claim 1 wherein the surfactant is present in an amount of from about 5% to about 10% by weight of the polyamide resin solids.

32. A process as claimed in claim 1 wherein said surfactant consists of a nonionic surfactant.

33. A process as claimed in claim 1 wherein said surfactant is an ethoxylated alkylphenol having from about 20 to about 50 repeating ethyleneoxy units and an alkyl group of from about 7 to about 18 carbon atoms.

34. A process as claimed in claim 1 wherein said surfactant is an ethoxylated nonylphenol having about 30 repeating ethyleneoxy units.

35. A process as claimed in claim 1 wherein said inorganic alkaline material is sodium hydroxide and the amount of sodium hydroxide is greater than about 0.75% of the weight of the polyamide.

36. A process as claimed in claim 1 wherein said temperature below the softening point of said polyamide during said dissolving is more than about 50° C. below the softening point of the polyamide resin.

37. A process as claimed in claim 1 wherein the total amount of water present in said dispersion is such that the weight ratio of water to polyamide resin solids is in the range from about 1:1 to about 5:1.

38. A process as claimed in claim 1 wherein the total amount of water present in said dispersion is such that the weight ratio of water to polyamide resin solids is in the range from about 1:1 to about 3:1.

39. A process as claimed in claim 1 wherein the total amount of water present in said dispersion is such that the weight ratio of water to polyamide resin solids is in the range from about 1.5:1 to about 2.85:1.

40. A process as claimed in claim 15 wherein less than about 2% by weight of the dispersion of residual organic solvent remains in the dispersion.

41. A process as claimed in claim 15 wherein less than about 1% by weight of the dispersion of residual organic solvent remains in the dispersion.

42. A process as claimed in claim 15 wherein the amount of residual organic solvent in the dispersion ranges from about 0.5% to about 0.95% by weight of the dispersion.

43. A process as claimed in claim 15 wherein, after said removing of said organic solvent, the pH of the dispersion is adjusted to a pH of about 4 to about 8.5.

44. A process as claimed in claim 15 wherein, after said removing of said organic solvent, the pH of the dispersion is adjusted to a pH of from about 6.0 to about 8.0.

45. A process as claimed in claim 1 wherein the resulting dispersion has a volume average particle size of less than about 20 micrometers.

46. A process as claimed in claim 1 wherein the resulting dispersion has a volume average particle size of from about 0.01 to about 20 micrometers.

47. A process as claimed in claim 1 wherein the resulting dispersion has a volume average particle size of from about 0.1 to about 1 micrometer.

48. A process as claimed in claim 1 wherein said surfactant consists of a nonionic surfactant.

49. A process of preparing a dispersion of a polyamide in water, said process comprising:
  dissolving a polyamide based on a polymerized fatty acid and having an amine value of greater than about 4 and a weight average molecular weight greater than about 35,000, in an organic solvent having a Hildebrand solubility parameter of from about 9 to about 12 to form a solution of said polyamide in said solvent, said polyamide and said solvent being at a temperature at least about 50° C. below the softening point of said polyamide during said dissolving,
  mixing with said solution a nonionic surfactant selected from the group consisting of ethoxylated alkylphenols having from about 20 to about 50 repeating ethyleneoxy units and an alkyl group of from about 7 to about 18 carbon atoms and an inorganic alkaline material, said inorganic alkaline material being present in said solution in an amount sufficient to cause said solution to exhibit a pH of at least about 11,
  adding, after said mixing with said surfactant and inorganic alkaline material, sufficient water containing an acid to said solution with mixing to form an oil-in-water dispersion, the temperature of said solution and said water being at least about 50° C. below the softening point of said polyamide during said adding, the amount of said acid being sufficient to neutralize a portion of said inorganic alkaline material, but insufficient to lower the pH of the resulting oil-in-water dispersion to below about 10, and
  removing an amount of said organic solvent from said oil-in-water dispersion sufficient to reduce the residual organic solvent content to less than about 2% by weight.

50. A process as claimed in claim 49 wherein the resulting dispersion has a volume average particle size of from about 0.01 micrometer to about 20 micrometers.

51. A composition of matter comprising an aqueous dispersion of a major amount by weight of water, a minor amount by weight of a polyamide having an amine value of greater than about 2, wherein at least a portion of the amine value of said polyamide is neutralized and wherein said polyamide has a weight average molecular weight greater than about 35,000; and wherein said dispersion contains a partially acid neutralized inorganic alkaline material.

52. A composition as claimed in claim 51 wherein said polyamide is comprised of a polymerized fatty acid.

53. A composition as claimed in claim 51 wherein said polyamide is comprised of a polymerized fatty acid derived from carboxylic acids which contain from about 8 to about 24 carbon atoms.

54. A composition as claimed in claim 51 wherein said polyamide is comprised of a polymerized fatty acid derived from carboxylic acids which contain about 18 carbon atoms.

55. A composition as claimed in claim 51 wherein said polyamide has an acid value no greater than about 2.

56. A composition as claimed in claim 51 wherein said polyamide has an amine value of less than about 40 and an acid value of no greater than about 1.0.

57. A composition as claimed in claim 51 wherein said polyamide has an acid value of no greater than about 2 and an amine value of from about 7 to about 10.

58. A composition as claimed in claim 51 wherein said polyamide is the product of the reaction wherein the ratio of total amine to total acid groups is from about 1.02:1 to about 1.1:1.

59. A composition as claimed in claim 51 wherein said polyamide is the product of the reaction wherein the ratio of total amine to total acid groups is from about 1.04:1 to about 1.08:1.

60. A composition as claimed in claim 51 wherein said polyamide has a weight average molecular weight of greater than about 40,000, but less than about 200,000.

61. A composition as claimed in claim 51 wherein said polyamide has a weight average molecular weight of from about 50,000 to about 100,000.

62. A composition as claimed in claim 51 wherein said polyamide has a polydispersity of less than about 4.

63. A composition as claimed in claim 51 wherein said polyamide has a polydispersity of less than about 3.5.

64. A composition as claimed in claim 51 wherein said polyamide has a polydispersity of less than about 3.0.

65. A composition as claimed in claim 51 wherein said polyamide has a polydispersity of between about 1.5 and about 3.0.

66. A composition as claimed in claim 51 wherein said polyamide has a polydispersity of between about 2.0 to about 2.8.

67. A composition of matter comprising an aqueous dispersion of a major amount by weight of water, a minor amount by weight of a polyamide having an acid value of greater than about 2, wherein at least a portion of the acid value of said polyamide is neutralized and wherein said polyamide has a weight average molecular weight of about 50,000 to about 150,000 and a polydispersity between about 1.5 and 3.

* * * * *